Patented Aug. 4, 1942

2,291,918

UNITED STATES PATENT OFFICE 2,291,918

MAGNESIA REFRACTORY FOR BRICK AND FURNACE LININGS

Norman Percy Pitt, Montreal, Quebec, and Lisle Hodnett, Ottawa, Ontario, Canada, assignors, by direct and mesne assignments, to Canadian Refractories Limited, Montreal, Quebec, Canada, a corporation of Canada No Drawing. Application July 20, 1940, Serial No. 346,650

8 Claims. (Cl. 106—60)

This invention relates to magnesia refractories for brick or formed in place furnace linings and is particularly directed to the provision of an improved refractory containing as essential constituent highly refractory material such as periclase and dicalcium silicate, with at least incidental portions of metal oxides in combined form.

It is well known that both periclase and dicalcium silicate are so refractory that it is exceedingly difficult to make dense clinkers from these two constituents alone. It is also known that stabilizing agents are necessary to make such refractories resistant to hydration and to prevent the dicalcium silicate from dusting. The raw materials from which such refractories are made normally contain, in addition to magnesia, lime and silica, varying proportions of metal oxides such as those of iron and aluminum and sometimes chromium. Known treatments of these materials for the production of commercial refractories have not made available the full benefit of the refractory character of the most useful refractory constituents obtainable therein.

An object of the present invention is to provide a material of improved refractoriness in brick or furnace lining form and an improved and convenient method of making it. Another object is to provide a convenient method for taking much greater advantage of the highly refractory character of periclase and dicalcium silicate in composite refractories to be used for brick and furnace linings.

The invention contemplates a two stage method, in the first stage of which is produced a dense clinker which frits or softens readily at temperatures as low as 1450° C. by virtue of the presence therein of calcium ferrite or ferrites, and in the second stage of which the calcium ferrite is changed to the more refractory magnesium compounds. The second stage of the method is carried out when the thermoplastic refractory is to be formed into brick to be burned or put in place in a furnace to constitute a burned-in-place lining. The thermoplastic clinker formed in the first stage consists essentially of a minor portion of calcium ferrite, to cause fritting of the mass at a convenient and practical temperature, and a major portion of magnesia in the form of periclase. Dicalcium silicate is usually present but it is not essential at this stage. The lime present forms with metal oxides present ferrites, such as tetracalcium alumino-ferrite, dicalcium and mono-calcium ferrite. These ferrites serve the purpose of causing the highly refractory periclase and dicalcium silicate to set rapidly when heat is applied and a dense clinker is thus formed. The relatively low melting calcium ferrites in the clinker are converted in the second stage to the much more refractory magnesium compounds of the metal oxides by the addition of silica to combine with the lime of the ferrites to form dicalcium silicate.

In carrying out the invention the raw materials containing magnesia, lime and silica with the customary metal oxides are mixed and burned, preferably with the addition of chrome ore as a stabilizer in the now usual way. The lime and iron oxide content of the raw mix are adjusted to insure the formation of calcium ferrites to permit dense clinker formation at the desired temperature. That is the lime-silica ratio is above that of dicalcium silicate to the extent of providing lime to form the calcium ferrites by combining with iron oxide, and alumina if any be present. About 3% of the calcium ferrites is the minimum effective proportion and more than 20% produces excessive fluxing of the thermoplastic refractory. The following is illustrative of the composition of the clinker,—periclase 65.0%, dicalcium silicate 21.5%, calcium ferrites (tetracalcium alumino ferrite, dicalcium ferrite and monocalcium ferrite) 13.5%. The lower melting ferrites serve as a matrix for the more refractory particles.

The clinker is then crushed and ground to graded grain sizes to form a mass of high density and finely ground silica is thoroughly and uniformly mixed and tempered with the basic refractory mass. The mixture is shaped into brick or put in place in a furnace and burned. The amount of silica to be added is calculated from the composition of the clinker and is such as to combine with the lime of the calcium ferrites of the mass to form dicalcium silicate. The iron oxide, and alumina if any, combine with magnesia to form magnesium ferrite and magnesium aluminate, both of which are of much higher refractoriness than the corresponding calcium compounds. This increases the dicalcium silicate content and reduces the content of the low melting constituents of the material. In the illustrative example given above 2.7% of silica was required and the burned material contained periclase 60.9%, dicalcium silicate 28.5%, magnesium ferrite 9.2% and magnesium aluminate 1.4%. Serpentine, talc or the like may be employed to provide the silica when little is required. Serpentine has a tendency to soften and permit the brick to warp before the silica has an opportunity to react with the ferrites.

In order to stabilize the newly formed dicalcium silicate against dusting 0.5 to 1.0% of finely divided calcium phosphate, boric oxide or equivalent is uniformly mixed in the mass before burning. For best results it is important that the finely divided silicate and stabilizing agent be uniformly mixed in the coarser graded particles of the thermoplastic refractory so that the periclase particles will be more or less surrounded by a coating of the newly formed dicalcium silicate. The iron oxide and alumina are absorbed by the periclase granules and the shell or coating of highly refractory dicalcium silicate tends to substantially stiffen the burned brick or lining under the influence of heat.

In the burned material the calcium ferrites have been balanced with silica in the presence of magnesia to take up the liberated metal oxides and there is formed in situ about the magnesia particles a portion of dicalcium silicate. The product has improved refractoriness and less difficulty is encountered in the burning operation from warping or cracking in the brick or furnace lining. The formation of the final product takes place at lower temperatures than when periclase and dicalcium silicates are used as such. In the production of brick per se the number of imperfectly formed brick is substantially reduced. A higher burning temperature may be used and a shorter time of burning, thereby reducing cost of production. In other words, the capacity of a brick burning kiln is substantially increased when using the present material.

It is to be understood that the material is particularly suited for making brick as such, as well as for rammed-in-place furnace linings. The brick may be burned in a kiln or in the furnace in which they are to be used.

We claim:

1. In the production of refractory materials, the method which comprises forming by burning a thermoplastic refractory containing a major portion of highly refractory material, including periclase, and a minor portion of less refractory calcium ferrites and thereafter burning said material with finely pulverized silica to convert the lime of the said ferrites into dicalcium silicate.

2. In the production of refractory material, the method which comprises burning raw materials containing magnesia, lime and silica with metal oxide including iron to form a dense clinker consisting essentially of periclase, dicalcium silicate, and not less than 3 nor more than 20% of calcium ferrites, crushing the clinker to graded particle size, uniformly mixing with the crushed clinker finely divided siliceous material and burning the mixture to convert the low melting calcium ferrites into dicalcium silicate and magnesium compounds of the metal oxide therein.

3. In the production of highly refractory magnesia materials, the method which comprises a clinkering stage wherein raw materials consisting essentially of magnesia, lime and silica are burned with metal oxide including iron to form a dense clinker consisting essentially of periclase, dicalcium silicate and calcium ferrites, and a conversion stage wherein said clinker is crushed, mixed uniformly with finely divided siliceous material and a stabilizing agent for dicalcium silicate and burned to convert the low melting calcium ferrites into stabilized dicalcium silicate and magnesium compounds of the acid oxides released from the ferrites.

4. In the production of refractory materials the method which comprises forming a thermoplastic refractory containing substantially 3 to 20% of calcium ferrite and burning said refractory with silica to combine with the lime of said ferrite.

5. In the production of refractory materials the method which comprises intimately mixing silica with a clinker containing a major portion of a highly refractory constituent including periclase and a minor portion including between substantially 3 and 20% of calcium ferrites and burning the mixture to convert the calcium ferrites to dicalcium silicate and at least one refractory magnesium compound.

6. A method as set forth in claim 5 wherein phosphate is intimately incorporated in said mixture to stabilize the dicalcium silicate formed upon burning.

7. A refractory material consisting of particles composed of magnesia, lime, silica and metal oxide, substantially all of the lime and silica being in the form of stabilized dicalcium silicate and the major portion of the magnesia being in the form of dense periclase and the balance in combination with metal oxide and absorbed by the periclase, at least a portion of the dicalcium silicate being formed in situ about and coating the magnesian portion of said particles.

8. A mass of refractory material composed of discrete mechanically stable and highly refractory composite particles which resist distortion of the mass in use, said particles having a body portion and a coating therefor, the body portion consisting essentially of periclase with a minor portion of metal oxides chemically combined therewith and said coating consisting substantially of stabilized dicalcium silicate formed in situ about the body portion to fix free lime present in highly refractory form.

NORMAN PERCY PITT.
LISLE HODNETT.